United States Patent [19]

Weinreich

[11] Patent Number: 5,075,993
[45] Date of Patent: Dec. 31, 1991

[54] COLOR DISPLAY APPARATUS

[76] Inventor: Stephen Weinreich, 14 Norton Rd., Monmouth Junction, N.J. 08852

[21] Appl. No.: 219,457

[22] Filed: Jul. 15, 1988

Related U.S. Application Data

[63] Continuation-in-part of Ser. No. 917,151, Oct. 9, 1986, Pat. No. 4,757,626, which is a continuation-in-part of Ser. No. 630,832, Jun. 13, 1984, Pat. No. 4,621,443.

[51] Int. Cl.$^5$ .............................................. G09F 13/00
[52] U.S. Cl. ........................................ 40/444; 40/448
[58] Field of Search ................. 40/427, 436, 437, 444, 40/448, 581, 560; 350/408, 339 F, 345; 358/251, 253; 340/815.1; 353/75

[56] References Cited

U.S. PATENT DOCUMENTS

| | | | |
|---|---|---|---|
| 2,398,799 | 4/1946 | Miller | 40/560 |
| 3,963,326 | 6/1976 | Buchert | 40/452 |
| 4,176,299 | 11/1979 | Thornton, Jr. | 315/163 |
| 4,330,813 | 5/1982 | Deutsch | 350/345 |
| 4,357,771 | 11/1982 | Olds | 40/444 |

FOREIGN PATENT DOCUMENTS

| | | | |
|---|---|---|---|
| 237707 | 9/1987 | European Pat. Off. | 40/448 |
| 2157049 | 10/1985 | United Kingdom | 350/345 |

Primary Examiner—Cary E. O'Connor
Attorney, Agent, or Firm—Mathews, Woodbridge & Collins

[57] ABSTRACT

A color display apparatus includes a mechanism for storing images on a plurality of partially transparent sheets. A drive mechanism brings one sheet into viewing position as another sheet simultaneously withdraws in the same direction to produce a smooth dissolve of the projected image. Silk screened stripes of material on the sheets prevent the sheets from rubbing against each other and harming the graphic information and otherwise prevent mechanical interference between the sheets. By contouring the surface of the screen, it is possible to create a three dimensional image by illuminating the rear surface with a television screen or other image storage or producing device. It is further possible to obtain a digitized color display by placing a fluorescent bulb behind the cells of the digitizing screen with each cell containing at least one liquid crystal element and at least one color filter element and then selectively controlling the liquid crystals to produce the digitized color display. The digitizing screen can also be used as an image conversion tool by illuminating original art work on the rear face of the digitizing screen and tracing the digitized image thereof from the front face of the screen.

30 Claims, 8 Drawing Sheets

COLOR DISPLAY APPARATUS

CROSS REFERENCE TO RELATED APPLICATIONS

This is a continuation-in-part of my copending application Ser. No. 917,151 filed Oct. 9, 1986, entitled IMPROVED DISPLAY APPARATUS, now U.S. Pat. No. 4,757,626, which is a continuation-in-part of application Ser. No. 630,832, filed June 13, 1984, entitled DIGITAL SCREEN DISPLAY APPARATUS, now U.S. Pat. No. 4,621,443. The entire contents of my copending application and issued patent are hereby incorporated in total by reference into this application.

BACKGROUND OF THE INVENTION

1. Field of the Invention

The invention relates to a digitizing screen apparatus which may employ a mechanism for displaying color graphic images by mixing colors within cells having at least one liquid crystal element and at least one filter element.

2. Description of Related Art

The patent literature discloses several attempts to produce a series of stored graphic images. One early technique was to drive a patterned backdrop with respect to a plurality of small apertures. Schemes such as the foregoing are described in U.S. Pat. Nos. 2,432,896; 2,507,975 and 3,742,631.

In U.S. Pat. No. 3,963,326, a data display panel is disclosed. Each cell of the display has a shutter type of mechanism which turns each cell on or off thus allowing each cell to either transmit light or to blank it out thereby producing an image. No provision is made for the mixing of colors within each cell nor to homogenize the color to produce a uniform color from each cell nor to effect an intermediate level of illumination. Each cell simply functions as an on or off mechanism.

Other U.S. Pat. Nos. of possible interest include U.S. Pat. Nos. 1,832,894; 3,335,457; 3,237,331; 3,314,179; 3,328,475; 3,568,346; 3,686,781; 3,783,539 and 3,987,558.

In addition to the foregoing, other efforts have been made to produce digital-like displays. For example, digitized screens can be found in places such as Times Square, New York City. According to one embodiment, a field of light bulbs is controlled by an array of photocells, each actuating a single bulb on the display screen through an amplifier circuit. Movies of shadow graphs and in some cases real shadows, are cast upon the screen from a control room behind the sign. The images projected on the photocells appear in lights on the display screen over the street.

Other, less costly efforts have been made to digitize images on a more modest scale. One device marketed under the name Channel 2000 incorporates a plurality of lenses. Another device known as Channel 1 used a single diffusing sheet and an egg crate separator.

It is also known in the prior art to produce a three dimensional image by projecting a moving picture on the front surface of a contoured screen.

A useful discussion of the design of light concentrators may be found in the book entitled THE OPTICS OF NONIMAGING CONCENTRATORS: Light and Solar Energy by W. T. Welford and R. Winston published in 1978 by Academic Press.

During the prosecution of my copending application, Ser. No. 917,151, the following patent references were also cited: 2,884,833; 2,663,960; and 4,333,707.

SUMMARY OF THE INVENTION

Briefly described, the invention comprises a storage mechanism for storing a plurality of images that may be used separately or in conjunction with an image element expansion and homogenizing screen which is referred to herein and in my copending application as a digitizing means. The storage means preferably comprises a plurality of relatively stiff sheets, each including several rows of graphic visual material separated by rows of transparent areas. The sheets are relatively stiff so that they do not buckle or wrinkle under their own weight when supported on upper and lower edges by tabs. Each pair of upper and lower tabs is offset from the tabs of the next adjacent sheet. A drive mechanism is attached to each of the sheets by the tabs thereon and is employed to take individual sheets out of registration with the other sheets and into viewing position so that the rows of graphic material thereon can be viewed. The drive mechanism preferably brings one sheet into viewing position as another sheet simultaneously withdraws in the same direction in order to produce a smooth dissolve of the viewed image. An image element expansion and homogenizing means is located in front of the storage means. Image elements from the storage means are expanded and homogenized by the digitizing screen so that the output image is a digitized mosaic of colors representative of the visual information on the sheets.

In order to prevent mechanical interference between adjacent sheets and to prevent abrasion of graphic material on the sheets and to reduce friction, vertical separator ribs of material are deposited thereon. The vertical separator ribs may be silk screened stripes of ink, or paint, or similar durable material.

The image element expansion screen has several novel applications. For example, a filter sheet including cells having several color filter areas therein can be placed between the digitizing screen and a TV screen or computer monitor. The raster scan of the black and white TV can then be used to selectively illuminate specific color filter areas thereby producing on the face of the digitizing screen a pattern of colors.

A fluorescent light having its energy concentrated in narrow bands of the red, blue and green areas of the color spectrum can be placed behind the digitizing screen. Each cell within the digitized screen can be fitted with at least one liquid crystal element and at least one color filter element wherein the liquid crystal elements are modulatable thereby producing a color display.

A tracing device can be constructed by placing the digitizing screen over a sheet of original art work and then back lighting the art work so as to form a digitized representation of the art work on the face of the digitizing screen. Pegs, pins, 5 or other holders can be used to hold tracing paper and the like on the face of the digitizing screen so that the image can be traced in color or shades of gray. Lastly, it is possible to contour the viewed surface of the digitizing screen so that the image has a three dimensional appearance. For example, the contour of a face may be incorporated into the viewing surface of the digitizing screen while the back portion of the digitizing screen is attached to a television set. The planar two dimensional face on the television screen is then converted into a digitized three dimensional face on the front of the screen. Artificial hair, glasses and the like can be added to the face contour to enhance the effectiveness of its appearance. If the TV screen produces eye movements or lip movements, the face will appear life-life. These and other features of the invention will be more further understood by reference to the following drawings.

DETAILED DESCRIPTION OF THE INVENTION

During the course of this description, like numbers will be employed to identify like elements according to the different views which illustrate the invention.

Figure 1:
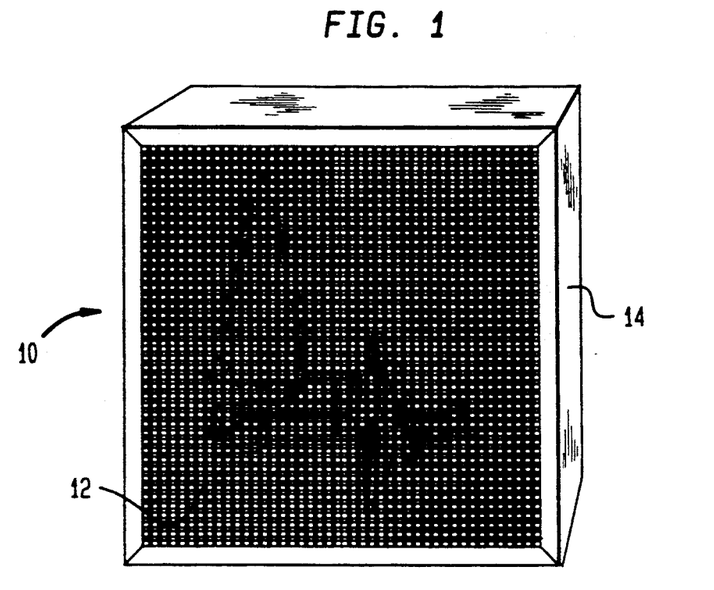
FIG. 1 is a perspective view of the preferred embodiment of the storage means.
Figure 2:
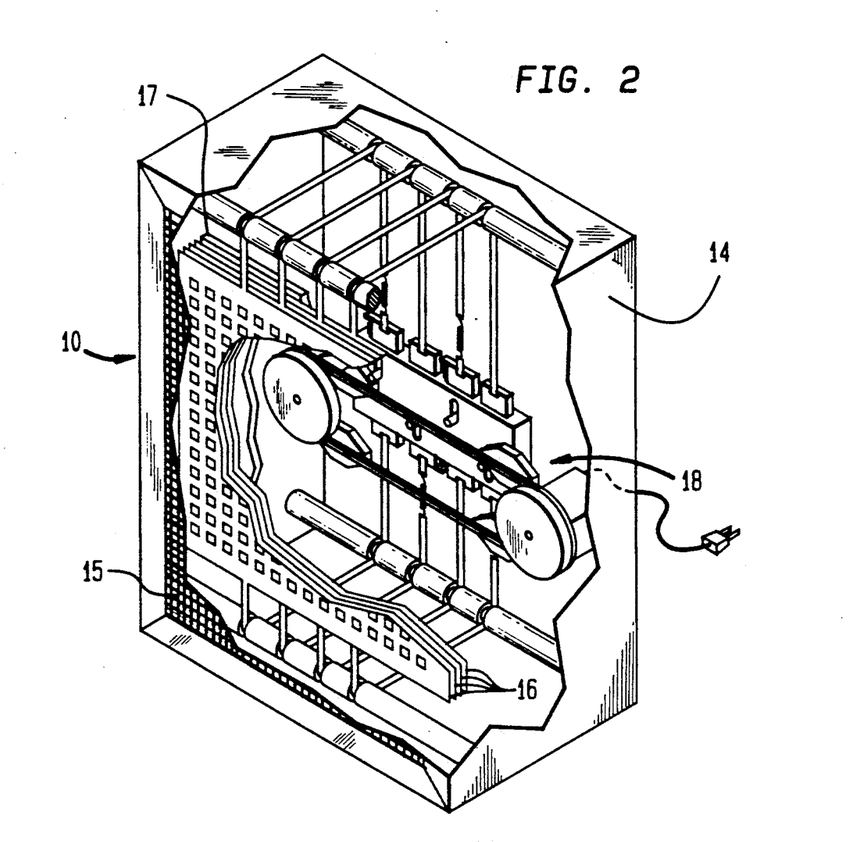
FIG. 2 is a partial cutaway perspective view of the storage means illustrated in FIG. 1.

The invention essentially comprises a multiple sheet storage device and a digitizing screen, both of which can be used independently or in conjunction with one another. FIG. 1 illustrates a storage device 10 which produces an image 12. Storage device 10 is illustrated without a digitizing screen in front of it. Cabinet 14 supports and surrounds the mechanism of the storage device 10. FIG. 2 illustrates the drive mechanism 18 employed to cause the graphic partially transparent sheets 16 to move up and down and which is described in detail in my U.S. Pat. No. 4,621,443. A mask 15 printed on a transparent plate and similar in structure to the one described in my copending application, preferably with the addition of vertical strips to mask areas previously hidden by vertical ribs of the digitizing screen, is located in front of sheets 16 and a retainer 17 keeps the sheets 16 from curling.

Figure 3:
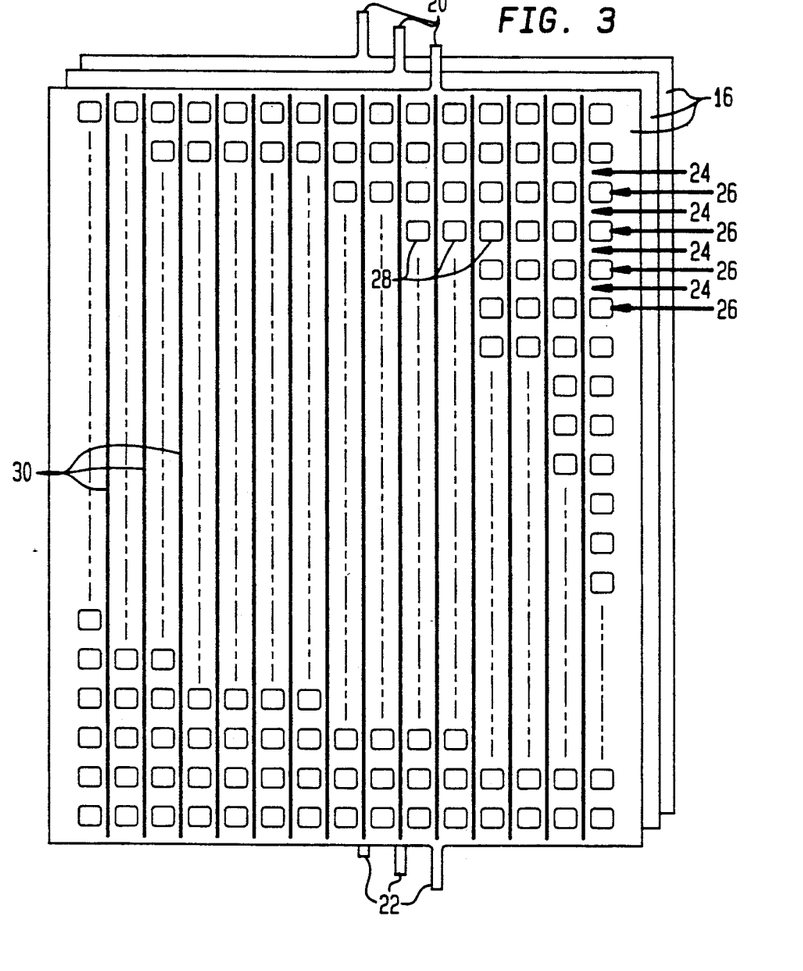
FIG. 3 illustrates the grouping of sheets.
Figure 4:
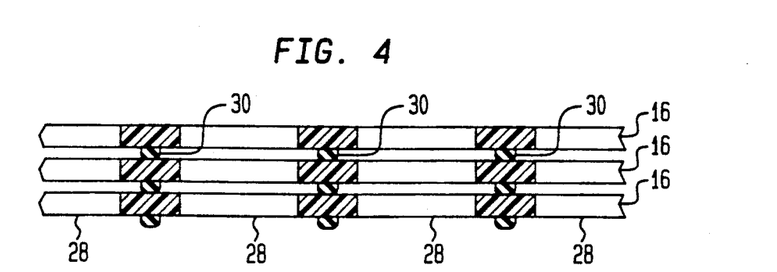
FIG. 4 is a partial cross-sectional view of the sheets in FIG. 3 illustrating the location of the separator ribs.

The important characteristics of sheets 16 are shown in detail in FIG. 3. Each sheet 16 includes an upper pull tab 20 located directly opposite a lower pull tab 22. Each pull tab 20 and 22 is displaced sideways with respect to the pull tabs 20 and 22 on adjacent sheets 16. This permits the sheets 16 to be stacked in a relatively compact grouping, while leaving separated attachment points for support and driving. Sheets 16 are preferably formed from a moderately stiff plastic material such as .007 inch thick Mylar ®. The characteristics of the plastic material ar that the sheets 16 will not wrinkle or buckle under their own weight. Rows of graphic information 24 are located horizontally on the sheet 16 and are ordinarily part of a continuous graphic image covering said sheet. Relatively clear transparent rows 26, preferably formed from a plurality of apertures 28, are alternately positioned between adjacent graphic information rows 24. The storage system 10 described thus far is essentially the same as set forth in my application Ser. No. 630,832, filed on July 13, 1984, now U.S. Pat. No. 4,621,443, issued Nov. 11, 1986, the entire substance of which is incorporated herein by reference. An improved sheet separator technique is illustrated in horizontal cross-sectional detail in FIG. 4. The cross-sectional view of FIG. 4 is taken through the clear apertures 28. A plurality of separator ribs 30 are used to space adjacent sheets 16 from each other. As shown in FIG. 3, the separator ribs 30 are disposed as vertical columns on each sheet 16 at right angels to the horizontal graphic rows 24 and relatively clear rows 26. Separator ribs 30 are integrated with each sheet 16. Separator ribs 30 are preferably silk screened on each sheet 16, using a relatively wear resistant material such as enamel which can stand up to substantial frictional abuse. Separator ribs 30 may be printed as a single thick coating or built up in several layers. The wear surface of the next adjacent slide 16 is a non-image bearing area. Accordingly, separator ribs 30 may be located on either face of slide 16. It is not necessary for the ribs 30 to be continuous. They can be discontinuous, provided that they produce the necessary separation. It is also possible that other patterns may be used, rather than parallel lines. Furthermore, the patterns could be formed of materials other than ink or paint, such as tape or rivets or possibly by the deformation of the slide material itself. In some cases, it may be desirable to apply the pattern 30 to both faces of every second slide 16. Complementary patterns on opposed faces may also be used to act as guides or limits to slide motion.

Figure 5:
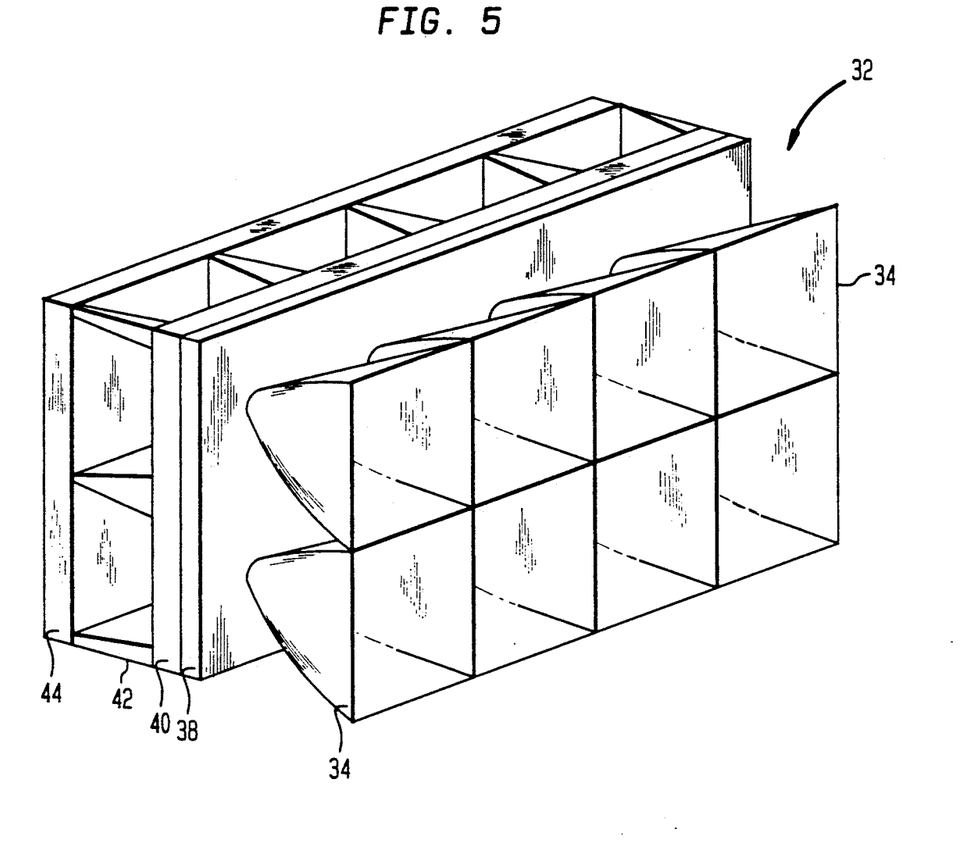
FIG. 5 is a perspective view of a liquid crystal controlled screen employing cone-light concentrator elements.

A light concentrator embodiment 32 is illustrated in detail in FIGS. 5, 6a, 6b and 6c. The application of light concentrators can be moderately broad and may include lenses. In FIG. 5, a plurality of light concentrator elements 34 are located behind a sheet 38, including a plurality of liquid crystal elements 36 and associated circuitry. A digitizing screen 41, comprising a back diffuser 40, a grid 42 and a front diffuser 44 are located on the opposite sides of the liquid crystal sheet 38 from the light concentrators 34. Light presented to each concentrator 34 is concentrated at LCD element 36. LCD element 36 can be electronically modulated to control the passage of the light through the digitizing screen 41. Therefore, a digitized television-like image can be produced on front diffuser 44 by modulating the light concentrated by concentrator 34 with LCD elements 36. The use of light concentrators 34 substantially increases the efficiency of the image producing system as a whole. The concentrators 34 collect light from behind the grid and prevent light from being lost. It is possible to capture much of the light that is available on the back side of the grid through the use of concentrators. Moreover, by concentrating the light through modulatable elements such as liquid crystals, it is possible to achieve a relatively efficient image forming system wherein only a small portion of the screen area need be modulatable elements. The light concentrator 34 embodiment and the use of liquid crystals 36 described thus far is essentially the same as set forth in my application Ser. No. 917,151, filed Oct. 9, 1986, the entire substance of which is incorporated herein by reference.

Figure 6A:
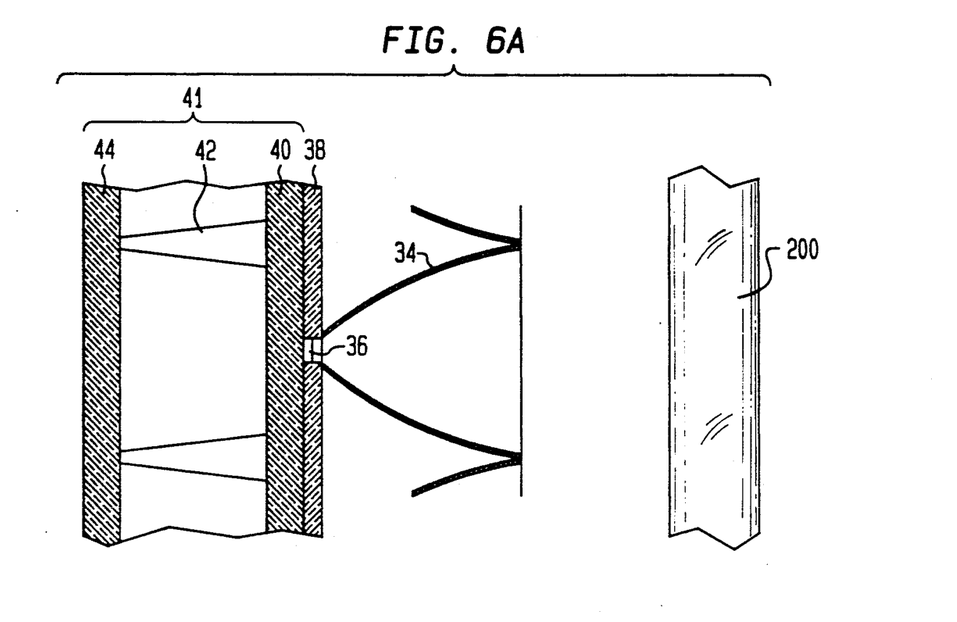
FIG. 6a is a detailed cross-sectional view of a liquid crystal controlled screen section from the embodiment illustrated in FIG. 5.

FIG. 6a illustrates the use of fluorescent light 200 to be applied to light concentrators 34. While it is possible to use any type of light source, fluorescent lighting such as that disclosed in U.S Pat. Nos. 4,176,294 and 4,176,299 is preferable. This type of fluorescent lighting has spectral peaks concentrated in narrow bands of the visible spectrum and is suited to producing a efficient color display when coupled with the disclosed invention. While fluorescent light 200 is shown as singular, the preferred embodiment would include a plurality of lights proportional in number to the size of the array of cells in embodiment 32.

Figure 6B:
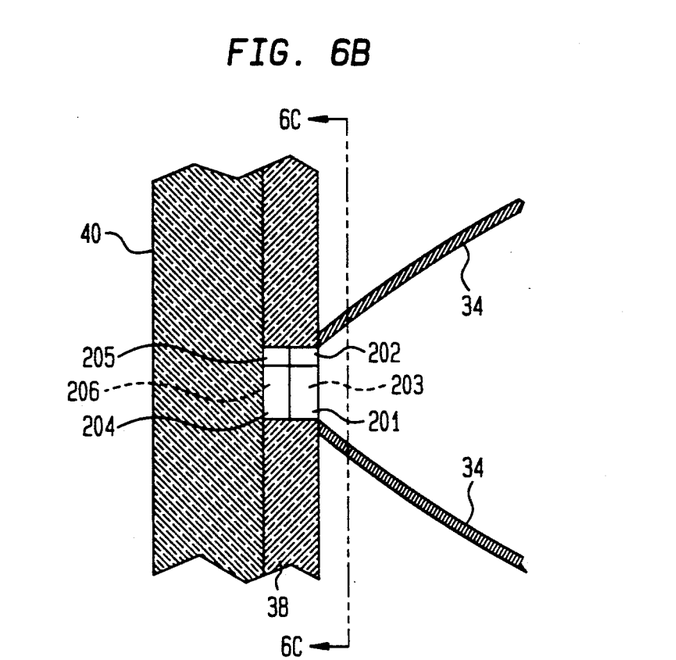
FIG. 6b is an exploded view of a liquid crystal controlled screen section.
Figure 6C:
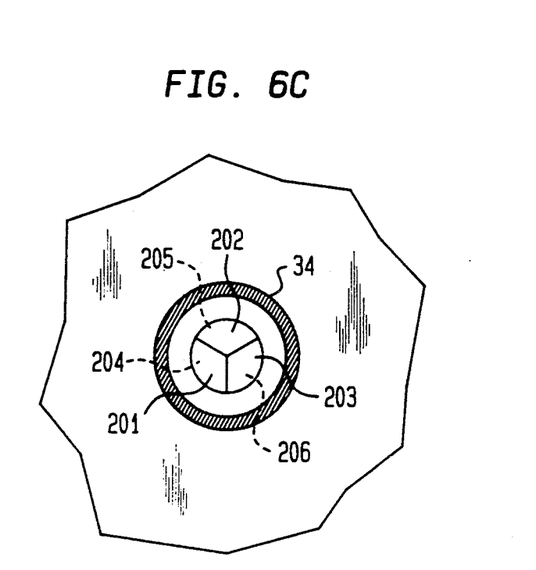
FIG. 6c is a detailed cross-sectional view of the preferred embodiment of the apparatus as illustrated in FIG. 6b.

FIGS. 6b and 6c illustrate an exploded view of LCD element 36. The preferred embodiment of LCD element 36 comprises three LCD segments, 204, 205, and 206 for each cell. Placed before LCD segments, 204, 205, and 206 are color filter segments, 201, 202, and 203. Preferably each filter segment corresponds to one of the three spectral peaks produced by fluorescent light 200. Thus, for example, filter segment 201 would be a green filter, filter segment 202 would be red filter, and filter segment 203 would be a blue filter, each filter corresponding to a peak wavelength produced by fluorescent light 200. The color filter segments 201, 202 and 203 could be placed behind LCD segments 204, 205 and 206, adjacent to back diffuser 40. The functioning of the system would be the same.

The use of small liquid crystal elements divided into a plurality of segments, preferably three, enables each element to control a display segment many times the area of the LCD element 36. By reducing the total are of liquid crystal for a given color display, the power requirement is similarly reduced. The small size of the LCD element area also provides ample space for switching elements, or even memory elements without interfering with the display image. Further, by mixing the color within each cell by homogenizing the color through back diffuser 40, the image quality is enhanced by having cells composed of many colors as compared to an image produced by cells composed of only primary colors. Although a color image could be created by making each cell produce only one primary color and grouping the cells in sets of three primary colors, that embodiment would require three times as many cells for similar information and would even then appear coarser.

Figure 7:
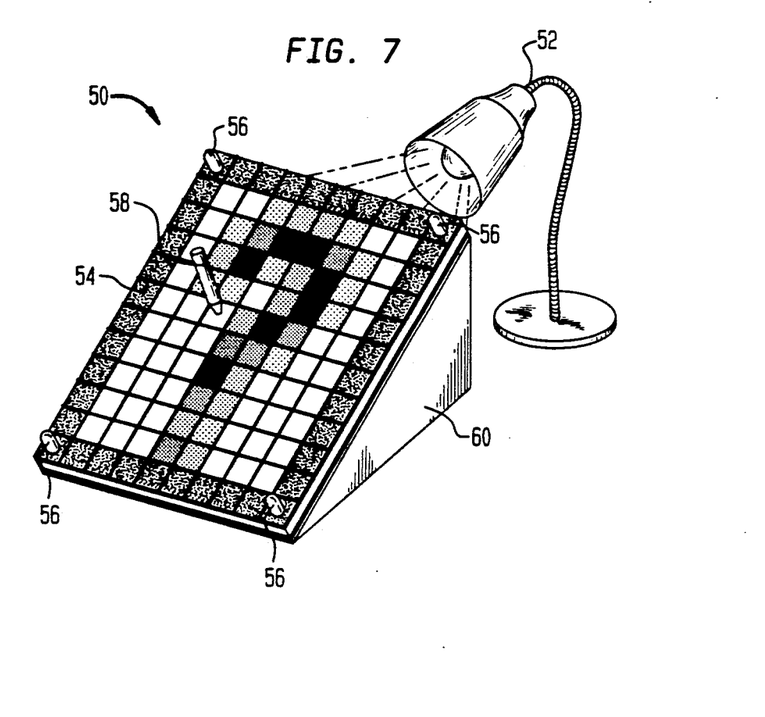
FIG. 7 is a perspective view of a tracing device or toy incorporating the digitizing screen.
Figure 8:
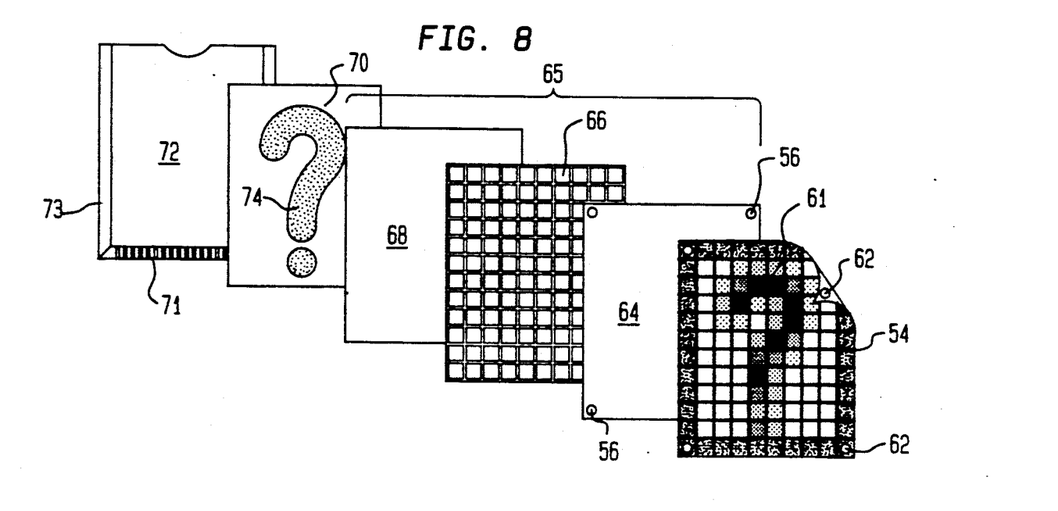
FIG. 8 is an exploded view of the tracing device shown in FIG. 7.

A tracing toy embodiment 50 of the invention is illustrated in detail in FIGS. 7 and 8. Tracing toy 50 is illuminated from behind by light source 52. Lined tracing paper 54 is held in position by four guide pegs or posts 56. The four guide posts 56 engage four holes 62 located respectively in each corner of the lined tracing paper 54. Tracings 61 of the image are created by using a pencil or crayon or similar writing instrument 58 on the surface of tracing paper 54. A stand or cabinet 60 supports the elements of the tracing apparatus 50. The inside walls of the cabinet 60 are mirrored so as to reflect light from source 52 toward elements 72, 70, 68, 66 64 and 54 respectively. Light source 52 can be a conventional table lamp or might be built into the game 50 itself.

The art work frame 72 and digitizing screen 65 are illustrated in an exploded overlapping view in FIG. 8. A clear plastic frame 72 is located on the bottom under the digitizing screen assembly 65 and is adapted to receive and align a transparent, translucent, or at least partially transparent graphic original 70. The frame 72 includes a plurality of push out slots 71 that permit the user to force the art work 70 out of the frame 72 with a wire if the art work 70 becomes stuck. Sidewalls 73 help to align the art work with respect to the rest of the elements. A digitizing screen section 65 comprising a front translucent diffuser 64, a grid 66 and a rear translucent diffuser 68 is located between graphic art work 70 and tracing paper 54. Guide posts 56 are preferably integrally connected to the corners of the front diffuser plate 64.

Frame 72 stabilizes cabinet 60 by which it is supported and holds original art work sheet 70. A cut-out on the top edge allows the original art work sheet 70 to be removed. Frame 72 is preferably formed from transparent or translucent material, such as acrylic, or is perforated to allow for the passage of light. The sidewalls 73 of frame 72 guide and align the original drawing sheet 70 and serve to separate the rear diffuser 68 and frame 72 an appropriate distance to receive art work sheet 70. Tracing sheet 54 must be either transparent or translucent and preferably comprise relatively inexpensive tracing paper. Sheet 54 should also be of sufficient weight so that drawing on it will not tend to wrinkle or tear it. The tracing sheet 54 is punched at locations 62 to receive index guide posts 56. A grid pattern printed on sheet 54 aligns directly over top of the cell separations of the grid 66. The cellular pattern is of sufficient width to allow the user to color within the lines in order to avoid unwanted overflow of color into adjacent cells. The lines are preferably black, therefore allowing the sheet 54 to appear tidy from either side, however, any opaque line color may be used where the coloring sheet 54 is of sufficient light transmissibility to allow viewing the reverse (i.e. uncolored) side under direct light. If the reverse side is to be the viewing side then the printed pattern should be face down before coloring and the original drawing should also be face down. A coloring medium, such as crayon 58, is preferably provided in a variety of colors sufficient to meet the user's taste and needs. Original art work 74 may be pre-printed or may be made by the user using a transparent or translucent medium (i.e. such as crayons 58) on a transparent or translucent drawing sheet 70 (such as tracing paper). The original art work sheet 70 is slipped into the frame formed by the sides 73 of the frame 72. Light source 52 is then directed into the mirrored bottom of the cabinet 60 thereby illuminating the backside of plate 72. The user then notes the color of each cell on tracing sheet 54, selects an appropriate crayon 58 or other coloring medium as close as possible to the color of the image projected, and then colors that cell at an appropriate density or saturation to match the projected color. When all cells have been colored in this manner the user will have created art work 61 which has a pleasing mosaic-like quality and which may be based on the user's own, possibly crude, original drawing 74. A more experienced user might vary the colors and densities in order to make individualized art work 61.

The digitizing screen assembly associated with the toy 50 might be supplemented or modified in several ways. The receiving back plate sidewalls 73 should be of sufficient thickness to accept both the original art work 70 and a supplemental sheet or sheets. A typical supplemental sheet might carry a pattern of circles varying in density or a series of rainbow colored bands. One partial modification might allow the original drawing 70 to act as the rear diffuser 68. In addition, it is possible for the digitizing screen assembly to be replaced by a color filter so that simple color separations might be 5 prepared by hand. Lastly, special processors might be fabricated for use with specific original art work in specific formats. For example, a network of optical fibers might unscramble pictures which, in scrambled form have been colored by the user.

Figure 9:
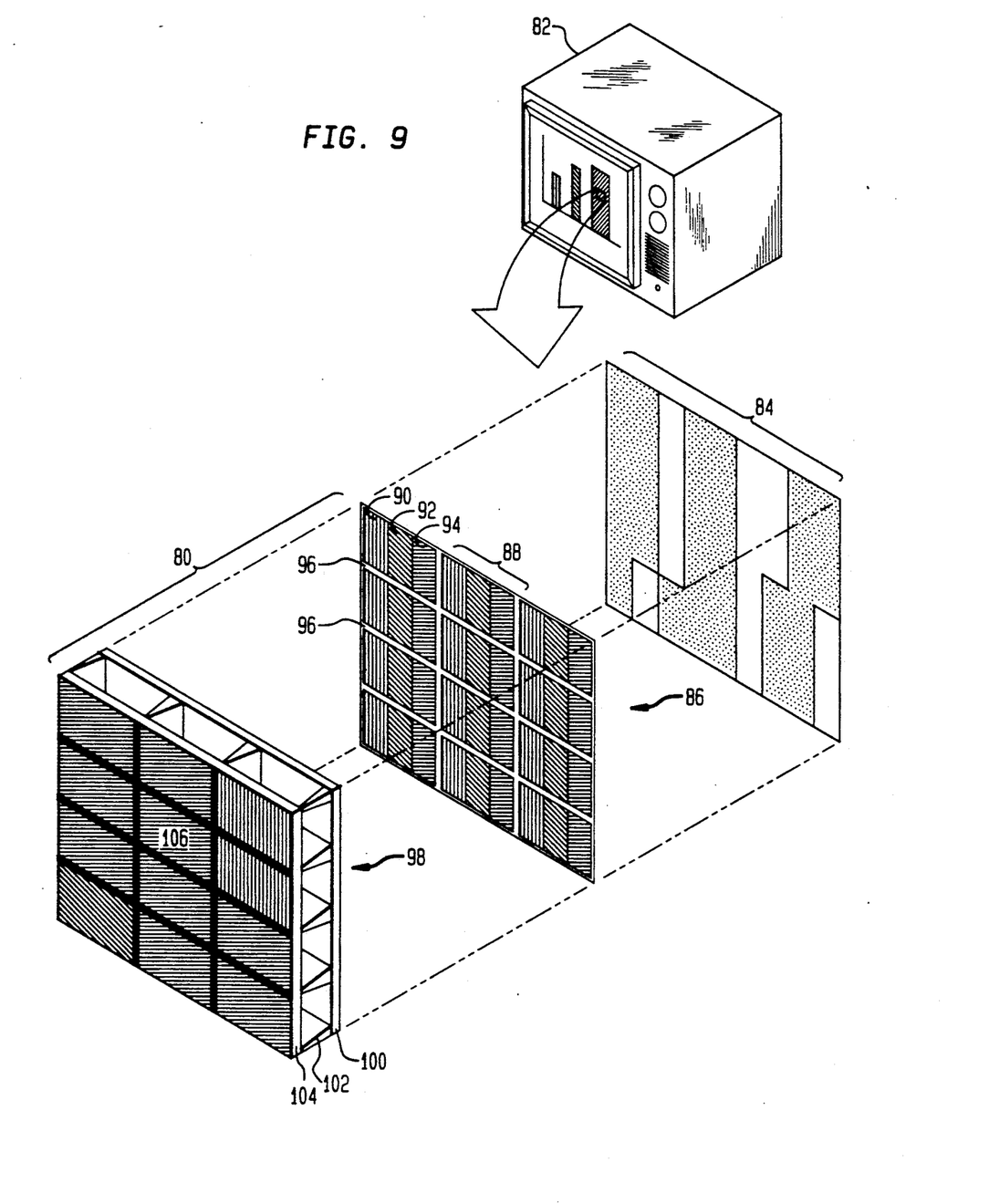
FIG. 9 illustrates a device for producing color images from a black and white television using a plurality of color filter cells and a digitizing screen.

One unique characteristic of the invention is the ability of the digitizing screen assembly to average the brightness of colors and light applied to the rear diffuser. It is possible to take advantage of this characteristic of the invention in order to produce a digitized color image from a black and white original. A selective color screen embodiment 80 is illustrated in FIG. 9. A black and white television 82 is shown creating a raster 84. A segment of the raster 84 is enlarged and expanded in FIG. 9. A color filter sheet 86 is located between the TV screen raster 84 and digitizing screen 98. Color filter sheet 86 preferably comprises a plurality of orthogonally oriented cells 88, each of which includes three cell areas 90, 92 and 94. According to the preferred embodiment cell areas 90, 92 and 94 are red, green and blue filter area segments respectively. However, there could be more or less than three filter cell elements and it is not necessary that the filter segments be red, blue or green. Each cell 88 is separated by a division line 96 from its neighbors. Digitizing screen 98 is located on the opposite side of color filter sheet 86 from raster 84 and comprises a rear diffuser 100, a grid 102 and a front diffuser 104 structured in the manner described with regard to previous digitizing screen assemblies. An image 106 is formed on the front diffuser 104. The color of the sections of image 106 are controlled by the selective illumination of the cell areas 90, 92 and 94 by television raster 84. It is readily apparent that the color of a cell in the viewable image 106 is dependent upon the position and the brightness of the illumination behind filter areas 90, 92 and 94. For clarity FIG. 9 does not show any cell being illuminated through more than one color filter area. However, it is not intended that such limitation be inferred. Such a filter might also be arranged to provide different brightness levels over different sections of the cell. The filter then might be used to produce a variable brightness image from a directable light source which may be difficult otherwise to vary in intensity. A laser is an example of such a source.

There are cases where there are specific advantages to digitizing screen which are not flat and/or do not have parallel faces.

Figure 10:
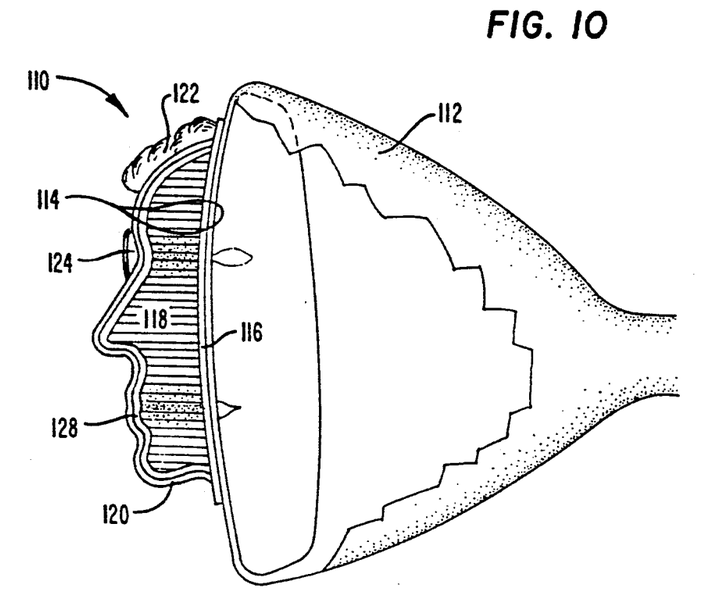
FIG. 10 is a cross-sectional view of a contoured digitizing screen in the shape of a face and attached to a television tube.
Figure 11:
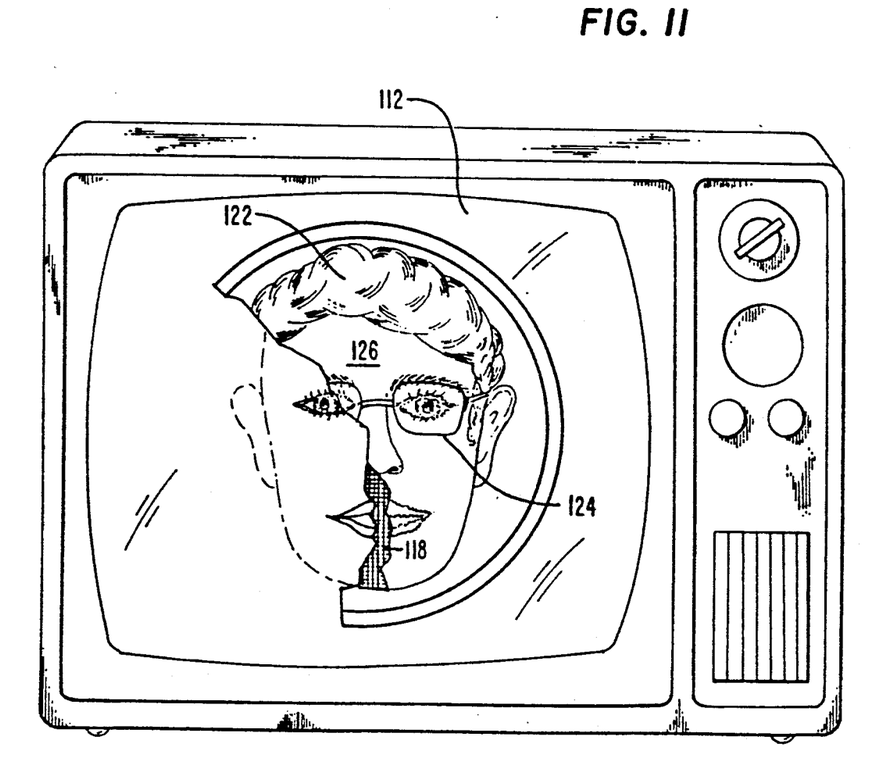
FIG. 11 is a cutaway front elevational view of the contoured digitizing screen illustrated in FIG. 10.

A contoured digitizing screen embodiment 110 is shown in FIGS. 10 and 11. Television tube 112 supports the three dimensional contour digitizing screen 114. Contour screen 114 includes a rear diffuser 116, an interior grid portion 118 and a front diffuser 120. The front diffuser 120 is shown shaped in a three dimensional likeness of a human head and may be blank or may be dressed up with such additions as hair 122, eyeglasses 124, eyebrows, or clothing, etc. A small gap 128 may be formed behind the front diffuser 120 in order to eliminate cell wall definition. The facial features are preferably left uncolored and only loosely defined in the shape of the face. Temporary adhesive may be employed to hold the face 110 in position on the surface of TV tube 112. Gap 128 may be maintained by occasional spacers at the cell junctions and/or by joining the front diffuser 120 and rear diffuser 116 only at the edges. Rear diffuser 116 may be included between grid 118 and the screen of TV tube 112, however, this may not be necessary where the cells are sufficiently long in relation to their cross-section thereby emulating the function of the rear diffuser 116. A special video program (either broadcast, prerecorded, or computer generated) typically presents an image of a human face on the screen of TV tube 112. The facial image 126 matches the size and position of the modeled facial assembly 110. Light from each portion of the image is carried through its associated cell in grid 118 to illuminate the associated portion of front diffuser 120. Thus the contoured from diffuser 120 appears to be an articulated human face 126. This effect may be enhanced by the use of cell mirroring or tapering as previously discussed. A specific enhancement that might be useful is to provide a graded filter at the rear diffuser 116 to balance the brightness of the image thereby providing greater brightness in portions of the facial image where the front diffuser 120 is least parallel to the TV screen. This is necessary as the output ends of the cells in those areas will be substantially larger than the input ends. Additional balancing may also be necessary to account for 5 differing cell lengths where there is significant loss of light over a long individual cell. The preferred method of light balancing is by appropriately patterning a filter placed between the rear diffuser 116 and the face of TV tube 112. The use of such a filter would avoid the need for brightness balancing by other methods. Such a filter could also be used to introduce graded color to the modeled front diffuser 120 so that it might be used more effectively with black and white television. Although some color could be introduced by other means, such as coloring the front diffuser 120, it is believed to be more economical to color a flat surface. The technique illustrated in FIGS. 1 and 11 could also be employed as a selective color screen located over a black and white television such as described with reference to the technique illustrated in FIG. 9. The contoured surface of the front diffuser 120 need not necessarily be in the shape of a face, but could, for example, be a terrain model or a geometric solid, for example a hemisphere could produce the illusion of a rotating earth. Moreover, the image producing system need not include a television, but could, for example, be the image storage or production system of the invention such as illustrated in FIGS. 1, 2, 3, 4, 5 and 6.

A useful variation of the contoured digitizing screen concept would be to distort the screen to accommodate a specific input format. For example, the grid 118 and diffusers 116 and 120 could be formed into nested cylinders with a light bulb in the center so that art work on or inside the interior of the rear diffuser 116 could be rotated by a heat motor. Mask and art work configurations could be varied to provide a different effect. The rear diffuser 116 and the rear face grid 118 might also be shaped to fit a portion of a cylinder so that a screen which appears flat to the viewer could contain art work and a drive system such as just described. Likewise the rear diffuser 116 might comprise the rotating cylinder that carries the art work.

Figure 12A:
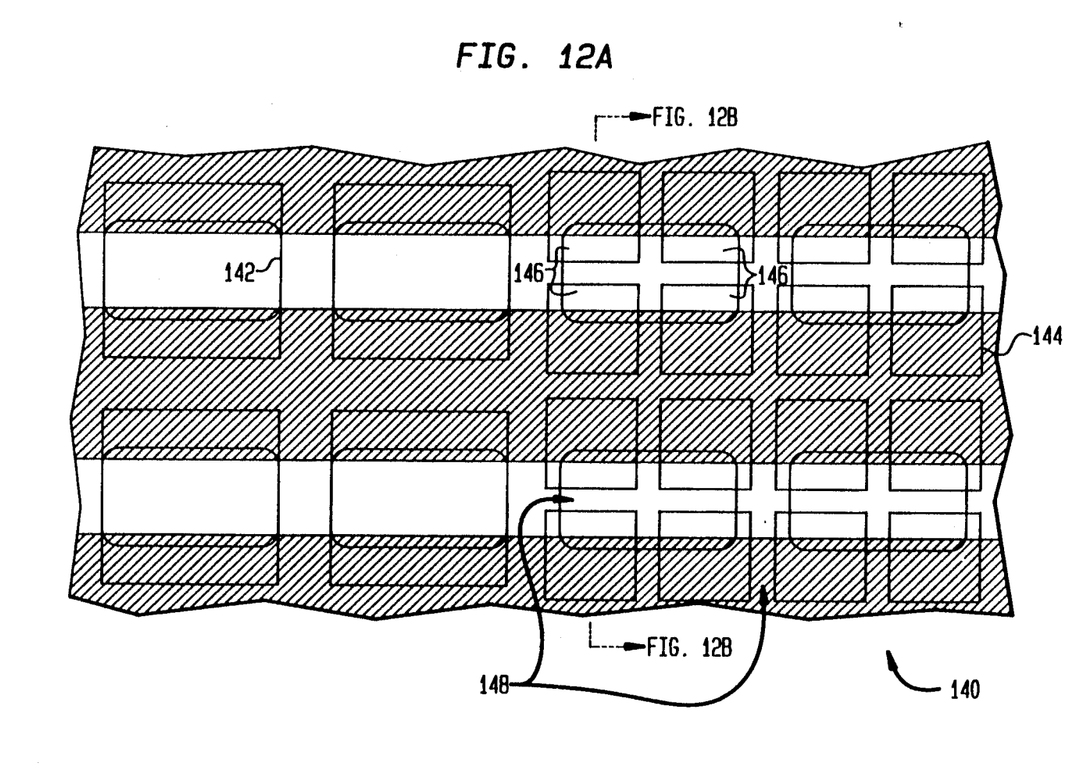
FIGS. 12A and 12B illustrate an embodiment for improving the resolution of the display apparatus with digitizing screen.
Figure 12B:
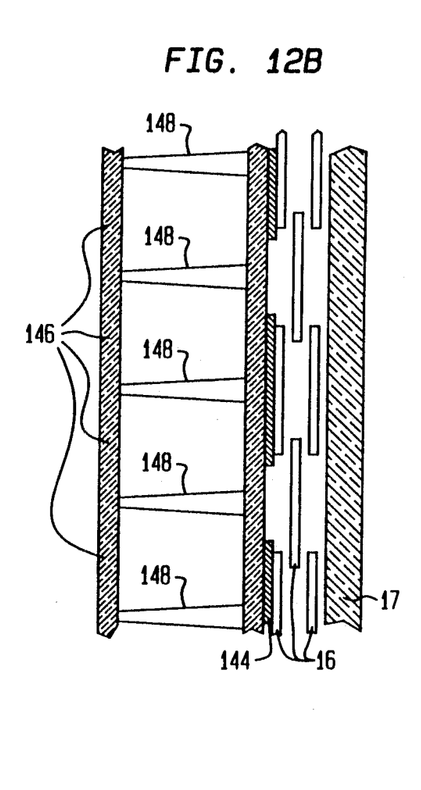

FIGS. 12A and 12B disclose an embodiment 140 of the digitizing screen and storage means which increases the resolution of the invention by a factor of four without requiring additional mechanical precision or complexity. According to embodiment 140 the normal grid cells 142 shown on the left side of FIG. 12A are replaced by grid cells 146 having one-half the dimensions of grid cells 142 and therefore one-quarter the area. Grid cells 146, also referred to as minicells 146, are positioned so that every second cell wall 148 coincides with the previous position of each wall of a larger cell 142. A mask 144 is located in the conventional location with transparent bands now crossing alternate cell walls 148 of minicells 146. With this arrangement the graphic information carried on one graphic storage element of a slide 16 behind the assembly 140 will be presented to a position at the intersection of four minicells 146. Each quadrant of that graphic element will then be expanded to cover one minicell 146. Accordingly, the images on the front face of the digitizing screen will have a greater and sometimes more desirable resolution. The embodiment 140 may be achieved either by making a grid entirely or partially out of minicells 146.

While the invention has been described with reference to the preferred embodiment thereof it will be appreciated by those of ordinary skill in the art that modifications can be made to the various embodiments and the parts thereof without departing from the spirit and scope of the invention as a whole.

I claim:

1. A color forming apparatus comprising:
    filter means including a plurality of cells each including at least one color filter segment and at least one liquid crystal element; and
    illumination means comprising at least one light source with emitted light concentrated in spectral peaks corresponding to the colors of said color filter segments;
    wherein each cell operates to selectively transmit light from said illumination means.

2. The color forming apparatus of claim 1 further comprising:
    image element expansion and homogenization means for expanding and mixing light from said cells and located adjacent 3. The color forming apparatus of claim 1 wherein said filter means includes at least two color filter segments and at least two liquid crystal elements.

4. The color forming apparatus of claim 13 further comprising:
    image element expansion and homogenization means for expanding and mixing light from said cells and located adjacent said filter means.

5. The color forming apparatus of claim 3 further comprising:
    light concentrator means located between said illumination means and said filter means, wherein said light concentrator means concentrates light from said light source onto said color filter segments and said liquid crystal elements.

6. The color forming apparatus of claim 5 wherein said light source is a fluorescent bulb.

7. The color forming apparatus of claim 5 wherein said light source is a Thornton, Jr.-type light source.

8. The color forming apparatus of claim 3 wherein said illuminator means comprises at least one light source with emitted light concentrated in spectral peaks corresponding to the colors of said color filter segments.

9. The color forming apparatus of claim 1 further comprising:
    light concentrator means located between said illumination means and said filter means, wherein said light concentrator means concentrates light from said light source onto said color filter segments and said liquid crystal elements.

10. The color forming apparatus of claim 1 wherein said light source is a fluorescent bulb.

11. The color forming apparatus of claim 1 wherein said light source is a Thornton, Jr.-type light source.

12. A color-forming apparatus for use with an illumination means, said apparatus comprising:
    filter means including a plurality of cells each including at least two color filter segments wherein each of said color filter segments transmits light having a specific bandwidth;
    at least one image element homogenization means for mixing light from said cells and located adjacent said filter means; and
    image element expansion means for expanding light from said cells and located adjacent said filter means,
    wherein said illumination means illuminates selected color filter segments thereby causing said image element expansion means and said image element homogenization means to produce a pattern of several different colors and further wherein said pattern of several different colors is formed by mixing the light transmitted by said color filters.

13. The color forming apparatus of claim 12, wherein said filter means comprises at least three color filter segments.

14. The color-forming apparatus of claim 12 wherein said image element expansion means comprises:
    a rear diffuser means located adjacent said color filter segments;
    a front diffuser means; and,
    a grid means separating said front diffuser means and said rear diffuser means.

15. The color forming apparatus of claim 12 wherein said illumination means comprises at least one light source with emitted light concentrated in spectral peaks corresponding to the colors of said color filter segments.

16. The color forming apparatus of claim 15 wherein said light source is a fluorescent bulb.

17. The color forming apparatus of claim 15 wherein said light source is a Thornton, Jr.-type light source.

18. A display apparatus comprising:
    image producing means including a plurality of cells wherein each cell comprises at least two liquid crystal segments and at least two color filters for producing a plurality of graphic images and presenting elements of individual images selectively;
    illumination means comprising at least one light source for illuminating said image producing means; and,
    light concentrator means located between said illumination means and said image producing means,
    wherein said light concentrator means concentrates light from said illumination means down onto at least two of said liquid crystal segments and color filters.

19. The display apparatus of claim 18 wherein each of said cells comprises at least three liquid crystal segments and at least three color filters.

20. The display apparatus of claim 18 wherein said illumination means comprises at least one fluorescent bulb with emitted light concentrated in spectral peaks of the visible spectrum corresponding to the colors of said color filter segments.

21. The display apparatus of claim 18 wherein said light source has emitted light concentrated in spectral peaks corresponding to the colors of said color filters.

22. The display apparatus of claim 21 wherein said light source is a fluorescent bulb.

23. The display apparatus of claim 21 wherein said light source is a Thornton, Jr.-type light source.

24. A color forming apparatus comprising:
  filter means including a plurality of cells each including at least two color filter segments;
  image element expansion and homogenization means for expanding and mixing light from said cells and located adjacent to said filter means; and,
  an illumination means comprising at least one light source with emitted light concentrated in spectral peaks of the visible spectrum corresponding to the colors of at least two of said color filter segments, wherein said illumination means illuminates selected color filter segments thereby causing said image element expansion and homogenization means to produce a pattern of several different colors.

25. A color display apparatus for forming at least one image comprising:
  an array of liquid crystal elements, wherein each liquid crystal element comprises at least two liquid crystal segments;
  an array of color filter elements, wherein each color filter element comprises at least two color filters;
  illuminating means for illuminating selected color filter elements thereby producing a pattern of primary colors;
  homogenizing means for mixing said pattern of primary colors thereby producing a multiplicity of colors and reducing the apparent coarseness of said image.

26. The color display apparatus of claim 25 further comprising:
  one light concentrator means corresponding to each color filter element.

27. The color display apparatus of claim 25 further comprising:
  one image expansion means corresponding to each color filter element.

28. The color display apparatus of claim 25 wherein said illuminating means comprises at least one light source wherein said light source emits spectral peaks which correspond in wavelength to the wavelength of each of said color filter elements.

29. The color display apparatus of claim 28 wherein said light source is a fluorescent bulb.

30. The color display apparatus of claim 28 wherein said light source is a Thornton, Jr.-type light source.

* * * * *